United States Patent
Raut

(10) Patent No.: US 9,143,559 B2
(45) Date of Patent: Sep. 22, 2015

(54) DIRECTORY SERVER REPLICATION

(75) Inventor: Sachin Ramesh Raut, Nagpur (IN)

(73) Assignee: International Business Machines Corporation, Armonk, NY (US)

( * ) Notice: Subject to any disclaimer, the term of this patent is extended or adjusted under 35 U.S.C. 154(b) by 2362 days.

(21) Appl. No.: 11/950,565

(22) Filed: Dec. 5, 2007

(65) Prior Publication Data

US 2009/0150398 A1  Jun. 11, 2009

(51) Int. Cl.
*G06F 7/00* (2006.01)
*H04L 29/08* (2006.01)
*G06F 17/30* (2006.01)
*H04L 29/12* (2006.01)

(52) U.S. Cl.
CPC ...... *H04L 67/1095* (2013.01); *G06F 17/30575* (2013.01); *G06F 17/30212* (2013.01); *H04L 29/12056* (2013.01); *H04L 61/1505* (2013.01)

(58) Field of Classification Search
USPC ................... 707/610, 644, 603, 633
See application file for complete search history.

(56) References Cited

U.S. PATENT DOCUMENTS

| | | | | |
|---|---|---|---|---|
| 6,973,463 | B2 * | 12/2005 | Merrells et al. ...................... | 1/1 |
| 7,072,911 | B1 * | 7/2006 | Doman et al. ................. | 707/615 |
| 7,155,463 | B1 * | 12/2006 | Wang et al. .................... | 707/634 |
| 7,243,103 | B2 * | 7/2007 | Murphy et al. ...................... | 1/1 |
| 7,290,017 | B1 * | 10/2007 | Wang et al. ............................ | 1/1 |
| 7,769,722 | B1 * | 8/2010 | Bergant et al. ................. | 707/681 |
| 7,827,136 | B1 * | 11/2010 | Wang et al. .................... | 707/610 |
| 7,962,709 | B2 * | 6/2011 | Agrawal ........................ | 711/162 |
| 2002/0059329 | A1 * | 5/2002 | Hirashima et al. ............ | 707/204 |
| 2003/0014523 | A1 * | 1/2003 | Teloh et al. ..................... | 709/226 |
| 2003/0088614 | A1 * | 5/2003 | Bellaton et al. ................ | 709/203 |
| 2003/0093413 | A1 * | 5/2003 | Dettinger et al. .................. | 707/3 |
| 2004/0230615 | A1 * | 11/2004 | Blanco et al. ............... | 707/104.1 |
| 2004/0230619 | A1 | 11/2004 | Blanco et al. | |
| 2007/0106864 | A1 * | 5/2007 | Moore et al. ................... | 711/170 |
| 2007/0185937 | A1 * | 8/2007 | Prahlad et al. ................. | 707/204 |
| 2007/0185939 | A1 * | 8/2007 | Prahland et al. .............. | 707/204 |
| 2009/0063575 | A1 * | 3/2009 | Blea et al. ...................... | 707/201 |

OTHER PUBLICATIONS

J. Huang et. al., "Improved Grid Information Service Using the Idea of File-Parted Replication," ADMA 2005, LNAI 3584, pp. 704-711, 2005.
A. Kumar et. al., "Edge Caching for Directory Based Web Applications . . . ," "Web content caching and distribution: Procs. of 8th international workshop, pp. 39-56, 2004.

(Continued)

*Primary Examiner* — Hosain Alam
*Assistant Examiner* — Eliyah S Harper
(74) *Attorney, Agent, or Firm* — Parashos Kalaitzis

(57) ABSTRACT

Information regarding requests made to a directory server by clients is collected. The requests including read, compare, search, write, and update requests. It is determined the number of the read, compare and search requests is greater than a threshold and/or whether the number of the write and update requests is greater than the threshold. In response to determining that either or both numbers are greater than the threshold, the following is performed. The process by which the directory server should be replicated is determined based on the information collected. The type of replication as to which the directory server should be replicated is also determined based on the information collected. A new directory server is then replicated from the directory server using the determined process. The new directory server has the determined type of replication.

20 Claims, 5 Drawing Sheets

(56) References Cited

OTHER PUBLICATIONS

A. Kumar, "The OpenLDAP Proxy Cache," accessed from Internet web page www.openldap.org/pub/kapurva/proxycaching.pdf, dated 2003.

S.S.B. Shi et. al., "An enterprise directory solution with DB2," IBM Systems Journal, vol. 39, No. 2, 2000.

A. Buecker et. al., "Performance tuning for IBM Tivoli directory server Red Paper," Mar. 2007.

R. Harrison et. al., "lightweight Directory Access Protocol (LDAP) Bulk Update/Replication Protocol (LBURP), "RFC 4373, www.ieff.org, Jan. 2006.

A. Fitterer et. al., "Introduction to ITDS version 6.1," www•306.ibm.com/software/sysmgmt/products/support/supp_tech_exch.html, Jul. 19, 2007.

R. Dayal, "LDAP Replication Draft Analysis and Design Document." www.mozilla.org, Feb 6, 2002.

E. Reed et al, "LDAP Replication Architecture," www.standford.edu/-hodges/LDUP, Apr. 17, 1998.

(Unauthored), "LDAP Replication proposal comparison matrix," www.standford.edu/-hodges/LDUP, presumably dated no later than 2002.

* cited by examiner

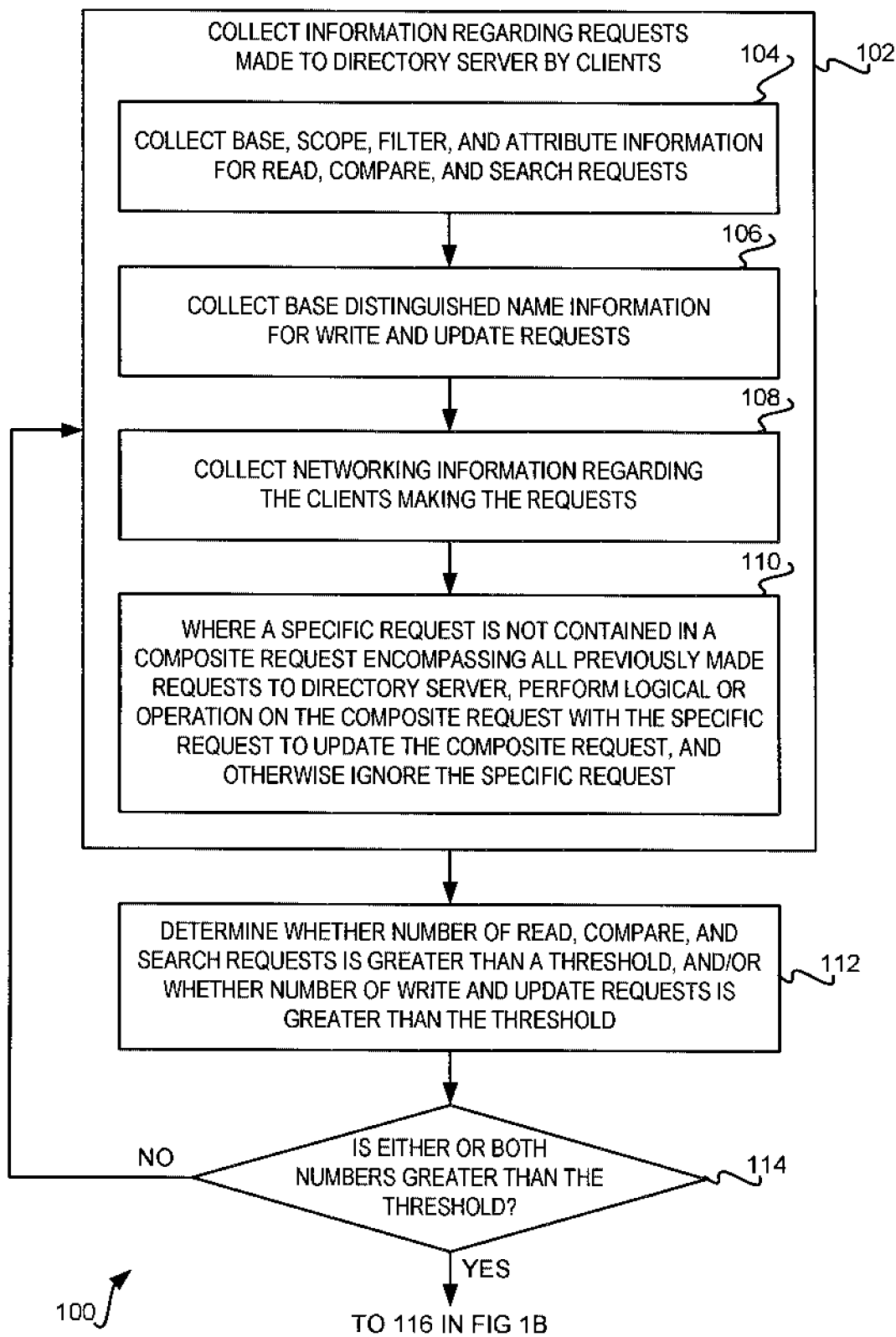

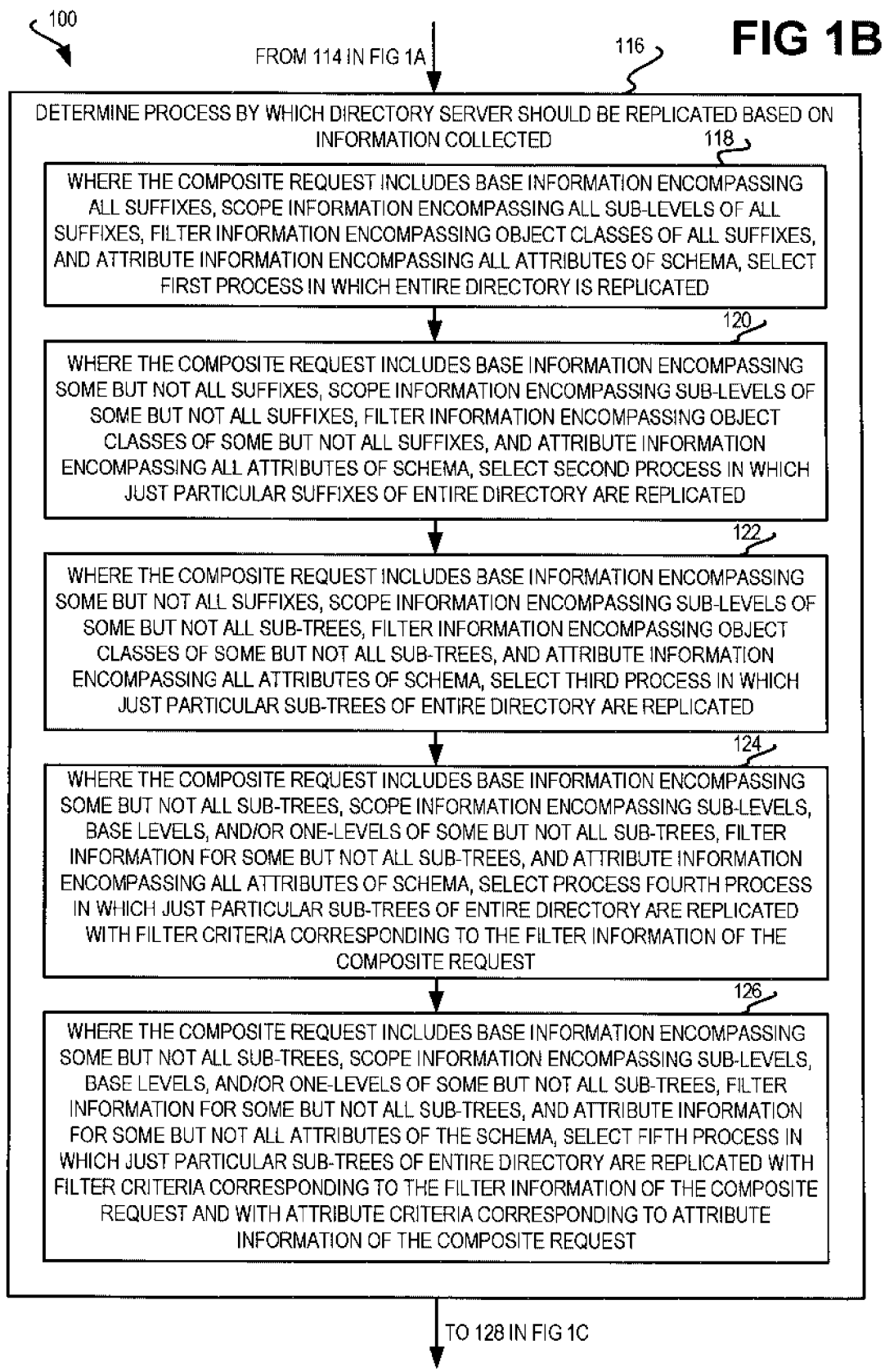

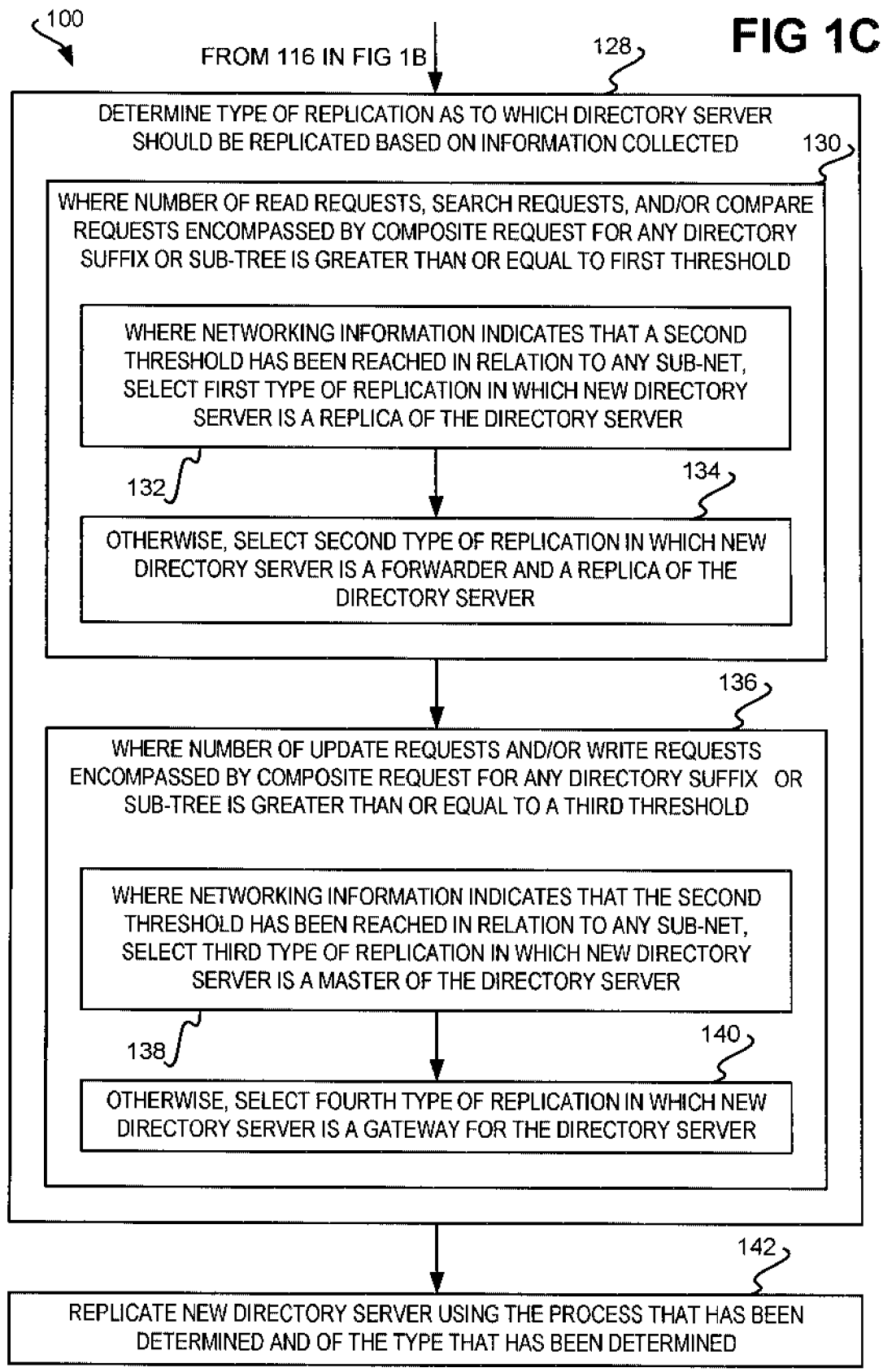

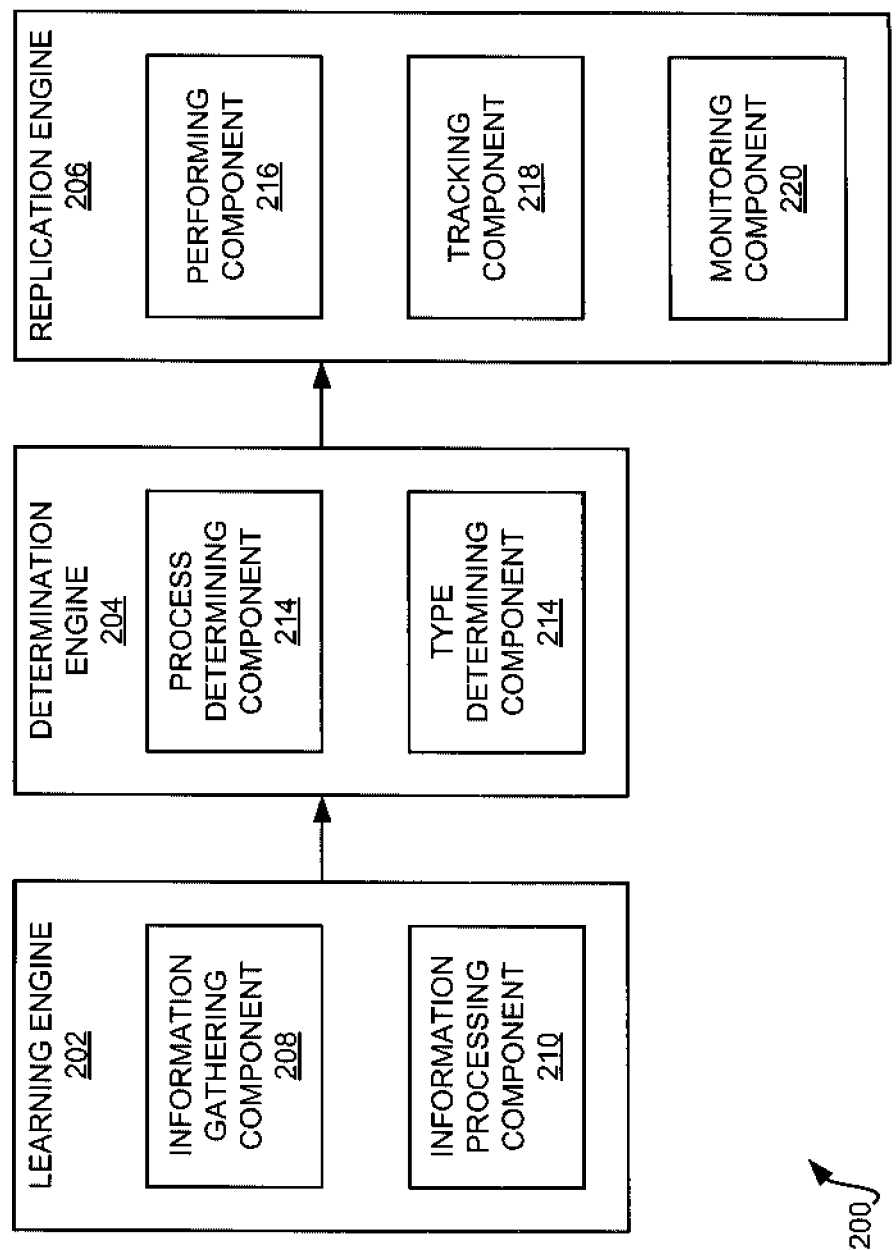

DIRECTORY SERVER REPLICATION

FIELD OF THE INVENTION

The present invention relates to directory servers, which are network servers that provide directory services or naming services, and more particularly to replicating such directory servers.

BACKGROUND OF THE INVENTION

A directory server is a network server that provides directory services or naming services. A directory service provides a directory of names, profile information, and machine addresses of users and resources on a network. It is used to manage user accounts and network permissions. When sent a user name, a directory service returns the attributes of that individual, which may include a telephone number as well as an e-mail address. A naming service converts a name into a physical address on a network, somewhat similar to someone looking up a phone number in a telephone book by first and last name. Examples of directory servers include lightweight directory access protocol (LDAP) servers, Active Directory (AD) servers, user location service (ULS) servers, and other types of directory servers.

For instance, an example directory server may include two suffixes: a first suffix including o=company and c=us, and a second suffix including o=company and c=in. In this example, "o" specifies an organization and "c" specifies a country. The directory server may also include two sub-trees: a first sub-tree including ou=unit, o=company, and c=us, and a second sub-tree including ou=unit, o=company, and c=in. In this example, "ou" specifies an organizational unit. In an example scenario relating to this directory server, it may be found that just the sub-tree including ou=unit, o=company, and c=us receives many requests from clients, where these requests specifically relate to particular directory entries and for particular attributes of those directory entries. As such, a network administrator may determine that the directory server in question is overloaded by requests, and has to be replicated to relieve the directory server of some of this congestion.

However, the network administrator is limited in the prior art as to how he or she can replicate the directory server. First, the administrator may manually replicate the entire directory of the directory server to a new directory server. However, this is disadvantageous, because just the sub-tree including ou=unit, o=company, and c=us has received many requests, and even then these requests are for just some of the directory entries and just for some of the attributes of these entries. Therefore, replicating the entire directory is overkill in relation to current needs.

Second, the administrator may manually replicate just the portion of the directory server relating to the suffix including o=company and c=us. This is also overkill to some extent, because just the sub-tree including ou=unit, o=company, and c=us has received many requests, and as before even these requests are for just some of the directory entries and for just some of the attributes of these entries. Third, the administrator may manually replicate just the portion of the directory server relating to the sub-tree including ou=unit, o=company, and c=us. Again, however, this is overkill to some extent, because the requests in question relate to just some of the directory entries and to just some of the attributes of these entries.

The prior art for directory replication is thus disadvantageous in at least two respects. First, the network administrator has to manually monitor the directory server and manually initiate replication of the directory server. That is, the directory server replication process is not autonomous. Second, the granularity at which the network administrator is able to replicate the directory server does not closely match or correlate to the requests made to the directory server that are causing the need for such replication. These and other shortcomings of the prior art are addressed by the present invention.

SUMMARY OF THE INVENTION

The present invention relates to directory server replication, particularly such replication that can be performed autonomously without user interaction and at a granularity that matches or correlates to the requests made to the directory server that are causing the need for such replication. A method for replicating a directory server of one embodiment of the invention collects information regarding requests made to the directory server by clients. The process by which the directory server should be replicated is determined based on the information collected. Similarly, the type of replication as to which the directory server should be replicated is determined based on the information collected. Thereafter, new directory server is replicated from the directory server using the process that has been determined. The new directory server has the type of replication that has been determined.

A system of an embodiment of the invention includes at least a learning engine, a determination engine, and a replication engine. The teaming engine collects information regarding requests made to a directory server by clients. The determination engine determines the process by which the directory server should be replicated based on the information collected, as well as the type of replication as to which the directory server should be replicated based on the information collected. The replication engine replicates a new directory server from the directory server using the process that has been determined, where the new directory server has the type of replication that has been determined.

A computer-readable medium of an embodiment of the invention includes one or more computer programs stored thereon to perform a method for replicating a directory server. It is noted that the computer-readable medium may be a recordable data storage medium, or another type of medium, such as a modulated carrier signal. The method collects information regarding requests made to a directory server by clients. The requests including read, compare, search, write, and update requests. The method determines whether a number of the read, compare and search requests is greater than a threshold and/or whether a number of the write and update requests is greater than the threshold.

In response to determining that the number of the read, compare, and search requests is greater than the threshold and/or that the number of the write and update requests is greater than the threshold, the method performs the following. The method determines the process by which the directory server should be replicated based on the information collected, and also determines the type of replication as to which the directory server should be replicated based on the information collected. The method then replicates a new directory server from the directory server using the process that has been determined, where the new directory server has the type of replication that has been determined.

Embodiments of the invention provide for advantages over the prior art. Embodiments of the invention can be performed autonomously, without user interaction. As such, directory servers are monitored based on the requests made by clients to the directory servers, and are replicated as needed, without a network administrator or another user having to perform the monitoring or initiate the replication. Furthermore, the replication of the directory server can be performed at a level of granularity corresponding to the requests made to the directory server that are driving the need for replication. For example, if just given attributes of a given sub-tree of the directory are the subject of the requests made to the directory server that are overloading the server, then the directory server can be replicated so that just the specific portions of the directory server corresponding to these attributes of the given sub-tree are replicated.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 1A, 1B, and 1C are flowcharts of a method for replicating a directory server, according to an embodiment of the invention.

FIG. 2 is a diagram of a system for replicating a directory server, according to an embodiment of the invention.

DETAILED DESCRIPTION OF THE DRAWINGS

Figure 3:
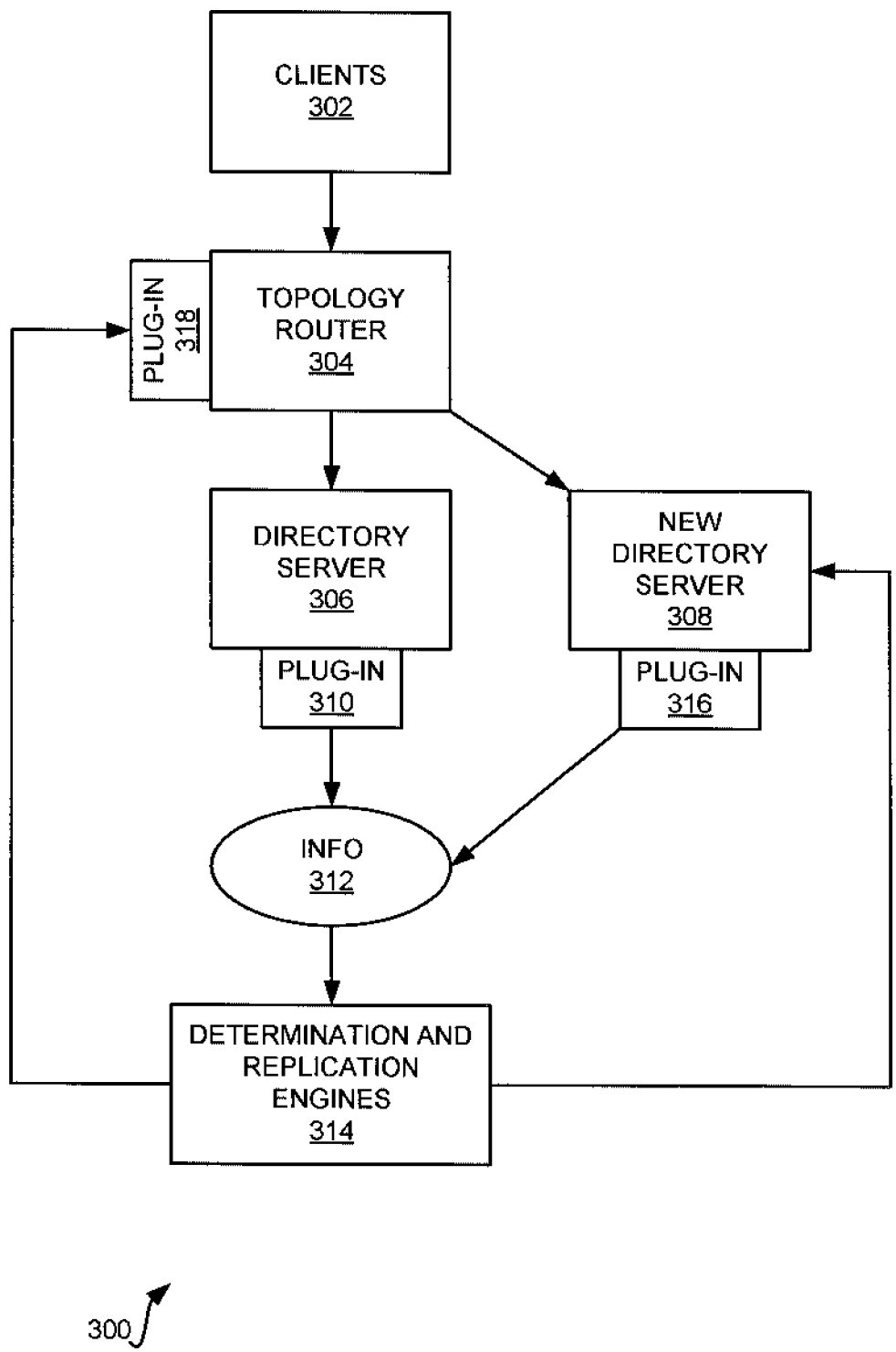
FIG. 3 is a diagram of a system for replicating a directory server, according to another embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIGS. 1A, 1B, and 1C show a method 100 for replicating a directory server, according to an embodiment of the invention. Referring first to FIG. 1A, the method 100 collects information regarding requests made to the directory server by clients (102). Such requests can include read, compare, and search requests, as well as write and update requests. Read, compare, and search requests are read-related requests, in that they do not change or add information to the directory server. A read request reads one or more nodes or entries of the directory. A compare request compares one or more nodes or entries of the directory with one or more other nodes or entries of the directory. A search request searches at least a portion of the directory for desired information, and may return one or more nodes or entries that contain this information.

Write and update requests, by comparison, are write-related requests, in that they change or add information to the directory server. A write request may create (i.e., add) a new node or entry to the directory. An update request may update the information contained within an existing node or entry of the directory.

For read, compare, and search requests, the method 100 collects base, scope, filter, and attribute information (104). Base information relates to the base distinguished name (DN) of the node or entry that is the subject of the request in question, and particularly specifies the top-level node or entry of a sub-tree that is subject to the request. That is, each node or entry within the directory is identified by a DN. The base DN for a read request identifies the top-level node or entry of the sub-tree from which information is to be read. A compare request includes two base DN's, one for the node or entry of each sub-tree that is to be compared. The base DN for a search request identifies the top-level node or entry of a sub-tree of the directory against which a search is to be performed.

Scope information relates to the extent to which the sub-tree having a top-level node identified by the base DN is to be subjected to the operation specified by the request in question. Base-level scope, for instance, specifies that just the node or entry identified by the base DN is to be subjected to the read, compare, or search operation. One-level scope, by comparison, specifies that just the immediate children nodes one-level below the node or entry identified by the base DN are to be subjected to the read, compare, or search operation. Sub-tree, or sub-level, scope specifies that all the nodes of the sub-tree having a top-level node or entry identified by the base DN are to be subjected to the read, compare, or search operation.

Filter information relates to how the nodes specified by the base DN and the scope information are to be filtered to further more narrowly specify the nodes that are to be subjected to the operation specified by the request in question (i.e., a read operation, a compare operation, or a search operation). A filter can be a logical statement, where the filter information can include one or more such filters that are themselves inter-related by logical statements. For example, a first filter may be (cn>=a && cn<=n) and a second filter may be (ou=unit && o=company && c=us). In the first filter, "cn" specifies an attribute, such as "customer number," such that the first filter indicates that the customer number has to be between the values a and n inclusive. The second filter indicates that the attribute organization unit has to be equal to "unit," the attribute organization has to be equal to "company," and the attribute country has to be equal to "us." The first filter and the second filter may themselves be related such that (first filter && second filter), such that the filter information specifies all the node or entries, subject to the scope information constraints, that satisfy both the first and the second filters.

Attribute information is similar to filter information, and relates to how the nodes specified by the base DN and the scope information, as filtered by the filter information, are even further to be more narrowly specified to yield the nodes that are to be subjected to the operation specified by the request in question. Attribute information specifies a set of one or more attributes of the form (attr={attr1, attr2, ..., attrN}). Thus, for a node to be subjected to the operation specified by the request in question, note only does it have to be within the scope specified by the base DN and the scope information and satisfy the filter information, but it also has to have a value of the attribute attr as one of {attr1, attr2, ..., attrN}.

For write and update requests, the method 100 collects base DN information (106). As indicated, the base DN information is the base DN of the node or entry that is the subject of the request in question. In the case of a write operation, the base DN specifies the new node that is to be added. In the case of an update operation, the base DN specifies the node for which information is to be updated, such as the attributes thereof.

The method 100 also collects networking information regarding the clients making the requests (108). Such networking information may include the network addresses of the clients, such as their Internet Protocol (IP) addresses, and the sub-nets of these clients. A sub-net is a logical division of a network, which is created to improve performance and/or security. To enhance performance, for instances, sub-nets limit the number of clients and other devices on the network that compete for available bandwidth. Instead of one network handling all the traffic, the network is divided into groups of clients and other devices that interact with each other most of the time. For security, the sub-net divisions can be based on servers that have restricted applications. In an IP network, a sub-net is identified by a sub-net mask, as can be appreciated by those of ordinary skill within the art.

Where a specific request is not contained within a composite request encompassing all previously made requests to the directory server, the method 100 performs a logical OR operation on the composite request with the specific request in question, in order to update the composite request, and otherwise ignores the request (110). When the method 100 is first performed, the composite request is initially initialized to NULL. Thereafter, the composite request is logically OR'ed with each request that is made by a client to the directory server and that is not contained already within the composite request. As such, the composite request can be considered as a set of all the requests that are made by the clients to the directory server; however, requests made to the directory server that are already contained by the composite request are ignored to avoid duplication and redundancy within the composite request.

In one embodiment, a query (i.e., a request) Q is said to be contained in another query Q' if the following three conditions are true. The first condition is that the base DN of Q' is the same as or a descendent of the base DN of Q. Furthermore, the scope of Q' must be the sub-tree scope (i.e., the sub-level scope) of Q except when the base DN of Q' is the parent of the base DN of Q and the scope of Q is base-level scope. In the latter case, the scope of Q' must be either the one-level scope or the sub-tree scope (i.e., the sub-level scope) of Q.

The second condition is that the attributes specified in Q is a subset of the attributes specified in Q'. The third condition is that the filter of Q is more restrictive than (i.e., contained within) the filter of Q'. As such, any node or entry satisfying the condition specified by the filter of Q also satisfies the condition specified by the filter of Q'. Furthermore, if two filters F1 and F2 both consist of a Boolean combination of atomic filters such that (&(F1)(!F2)) is trivially inconsistent, then the filter F1 is semantically contained in filter F2.

For example, the attribute set {x1, x2, ..., xn} may be the union of attribute sets appearing in the filters F1 and F2. To be trivially inconsistent, there cannot be any set of values {v1, v2, ..., vn} for the attributes {x1, x2, ..., xn} in their valid ranges such that the condition specified by (&(F1)(!F2)) is satisfied. If (&F1)(!F2))=B1+B2, ..., +Bk, where Bi is a conjunct of atomic filters, then this third condition can be written in terms of Bi as follows, that the filter F1 is contained in the filter F2 if i=1 ... k, Bi is trivially inconsistent. It is finally noted that a contained query is answerable from a cache if the attributes in the conditions above are interpreted as the union of required attributes and the attributes appearing in the filters.

The method 100 next determines whether the number of read, compare, and search requests—i.e., the total number of read requests, compare requests, and search requests—is greater than a threshold, and/or whether the number of write and update requests—i.e., the total number of write requests and update requests—is greater than this threshold (112). These two counts can be tabulated as part of the method 100 performing part 102, such that each time a read, compare, or search request is received, a read/compare/search number is incremented, and each time a write or update request is received, a write/update number is incremented.

In one embodiment, the threshold against which these numbers is compared is based on the following parameters. The first parameter is the hardware of the system. Efficient and fast hardware can process the queries more quickly than slower and less efficient hardware. The second parameter is the directory server, specifically the capabilities of the directory server. A greater threshold may be selected where the directory server is able to more quickly read, write, and compare the queries, whereas a lower threshold may be selected where the directory server more slowly reads, writes, and compares queries.

Where neither of these numbers is greater than the threshold (114), then the method 100 is repeated at part 102. However, where either or both of these numbers are greater than the threshold (114), then the method 100 proceeds to FIG. 1B, and determines the process by which the directory server should be replicated based on the information collected in part 102 (116). The process by which the directory server should be replicated is specifically the methodology that is followed or performed to replicate the directory server.

First, a first process is selected for replicating the directory server where:
  the composite request includes base information encompassing all the suffixes of the directory of the directory server;
  the composite request includes scope information encompassing all sub-levels (i.e., all sub-trees) of all these suffixes,
  the composite request includes filter information encompassing object classes of all the suffixes; and
  the composite request includes attribute information encompassing all attributes of the directory schema of the directory (118).

The first process is such that the entire directory is replicated within the new directory server. The suffixes of the directory are the suffixes of the first-level nodes of the root node of the directory. For example, these suffixes may be the various country attributes, such as "c=us", "c=in", "c=gb", and so on. Therefore, the base information of the composite request includes all the directory suffixes where the all these directory suffixes are found in one or more of the logically OR'ed requests within the composite request. Stated another way, each of the first-level nodes, corresponding to these suffixes, is identified by its base DN within the base information of the composite request.

The scope information of the composite request encompasses all the sub-levels, or all the sub-trees, of all these suffixes when all the sub-levels/sub-trees of the node corresponding to each suffix are each found in one or more of the logically OR'ed requests within the composite request. For example, each first-level node off the root node of the directory is a top-level node of one or more sub-levels or sub-trees. All of these sub-levels or sub-trees have to be encompassed by the logically OR'ed requests within the composite request for it to be said that the scope information of the composite request encompasses these sub-levels or sub-trees.

It is next noted that an object class is defined as the set of all attributes values to which a given attribute can be set. Therefore, the filter information of the composite request encompasses all the object classes of the suffixes of the directory when the filter information contains filters relating to each attribute value each attribute to which each node within the sub-trees or sub-levels of the suffixes can be set. Stated another way, for the constituent nodes of the sub-trees or sub-levels of each suffix, each such constituent node may have one or more attributes that can each be set to one or more different attribute values. The object classes of the suffixes are the sets of all these different attributes values to which all these different attributes of all these constituent nodes can be set. All of these object classes, then, have to be encompassed by the logically OR'ed requests within the composite request for it to be said that the filter information of the composite request encompasses these object classes.

Similarly, it is noted that the directory schema, which is the definition of the database of the directory of the directory server, defines all the different attributes for which the object classes define attribute values. Therefore, the attribute information of the composite request encompasses all the attributes of the schema when the attribute information includes information relating to each such attribute. That is, all the attributes of the schema have to be encompasses by the logically OR'ed requests within the composite request for it to be said that the attribute information of the composite request encompasses these attributes.

Therefore, in part 118, the method 100 specifies that the process by which the directory server should be replicated is that the entire directory of the directory server is replicated when, in effect, the composite request relates to each portion of the entire directory. Stated another way, if all the sub-trees/sub-levels of all the first-level nodes (i.e., the suffixes) of the directory are represented within the composite request, as well as all the object classes and attributes are represented within the composite request, then this means that directory replication is performed such that the entire directory is correspondingly replicated.

Next, a second process is selected for replicating the directory server where:
  the composite request includes base information encompassing some but not all of the directory suffixes;
  the composite request includes scope information encompassing all the sub-levels or sub-trees of some but not all of the suffixes;
  the composite request includes filter information encompassing all the object classes of some but not all of the suffixes; and
  attribute information encompassing all the attributes of the schema (120).
The second process is such that just the particular suffixes encompasses by the composite request are replicated within the new directory server. Thus, in effect, the second process differs from the first process in that the first process replicates all the suffixes within the new directory server—corresponding to the entire directory—whereas the second process replicates just the particular suffixes represented within the composite request.

For example, there may be three first-level nodes of the directory, corresponding to the suffixes "c=us", "c=in", and "c=gb". The base information of the composite request may encompass just the suffix "c=us". That is, just the base DN of the first-level node corresponding to this suffix is encompassed within the base information of the composite request. Where all the other conditions of part 120 are true as to this single suffix—the scope information encompasses all sub-trees or sub-levels of this suffix, the filter information encompasses all object classes of this suffix, and the attribute information encompasses all the directory schema attributes—then the second process is selected. In this respect, it is noted that these conditions of part 120 are similar to those of part 118. However, in part 118, these conditions have to be true for all suffixes of the directory, where all the suffixes are represented within the composite request. By comparison, in part 120, these conditions have to be true just for those suffixes of the directory that are encompassed by the composite request.

Next, a third process is selected for replicating the directory server where:
  the composite request includes base information encompassing some but not all of the directory suffixes;
  the composite request includes scope information encompassing sub-levels of some but not all of the sub-trees of the suffixes encompassed by the base information;
  the composite request includes filter information encompassing object classes of some but not all of the sub-trees of the suffixes encompassed by the base information; and
  the composite request includes attribute information encompassing all attributes of the directory schema (122).
The third process is such that just the particular sub-trees represented within the composite request are replicated to the new directory server. Thus, in effect, the third process differs from the second process in that the second process replicates all the sub-trees for the suffixes encompassed by the composite request within the new directory server, whereas the third process replicates just these suffixes' sub-trees that are encompassed by the composite request within the new directory server.

For example, there may be three-first level nodes of the directory, corresponding to the suffixes "c=us", "c=in", and "c=gb". The base information of the composite request may encompass just the suffix "c=us". That is, just the base DN of the first-level node corresponding to this suffix is encompassed within the base information of the composite request. However, the scope information and the filter information may not encompass all the sub-trees of this suffix (as in part 120), but rather encompass just some of the sub-trees of this suffix. Where this is the case—and where the attribute information still encompasses all the directory schema attributes—then the third process is selected. These conditions of part 122 are therefore similar to those of part 120. The difference is that in part 120 all the sub-trees of the particular suffixes encompassed by the base information of the composite request are encompassed by the scope information and the filter information, whereas in part 122 just some of these sub-trees are encompassed by the scope information and the filter information of the composite request.

Next, a fourth process is selected for replicating the directory server where:
  the composite request includes base information encompassing some but not all sub-trees of the directory of the directory server;
  the composite request includes scope information encompassing sub-levels, base levels, and/or one-levels the sub-trees encompassed by the base information;
  the composite request includes filter information for the sub-trees encompassed by the base information; and,
  the composite request includes attribute information encompassing all attributes of the directory schema (124).
The fourth process of part 124 is similar to the third process of part 122 in that just the particular sub-trees represented within the composite request are replicated to the new directory server. However, the fourth process differs from the third process in that the third process replicates one or more sub-trees off a first-level node, since in part 122 the base information of the composite request includes the base DN's for some but not all of the first-level nodes corresponding to the suffixes. By comparison, in part 124, the base information of the composite request does not include the base DN of any of the first-level nodes corresponding to the suffixes. Therefore, just the actual sub-trees that are encompassed by the composite request are replicated in the new directory server in part 124 of the method 100, with filter criteria corresponding to the filter information of the composite request. That is, the filter information specifies one or more filters, which define the filter criteria. These filters actually specify the sub-trees having base nodes specified by the base information.

For example, as before, there may be three-first level nodes of the directory, corresponding to the suffixes "c=us", "c=in", and "c=gb". However, the base information of the composite request may not encompass any of these suffixes, in that the base DN of none of the first-level nodes corresponding to these suffixes is encompassed within the base information of the composite request. Rather, the base information of the composite request in this case specifies the base DN of one or more nodes that are further down the directory hierarchy from the first-level nodes. The scope information in this case inherently encompasses sub-levels or sub-trees (i.e., all the descendants of a node specified by the base information), the one-levels (i.e., just the immediate descendents of a node specified by the base information), and/or the base levels (i.e., just a node specified by the base information) of each node specified by the base information. In this case then—and where the attribute information still encompasses all the directory schema attributes—the fourth process is selected.

Finally, a fifth process is selected for replicating the directory server where:
- the composite request includes base information encompassing some but not all sub-trees of the directory of the directory server;
- the composite request includes scope information encompassing sub-levels, base levels, and/or one-levels of the sub-trees encompassed by the base information;
- the composite request includes filter information for the sub-trees encompassed by the base information; and,
- the composite request includes attribute information encompassing some but not all attributes of the directory schema (126).

The fifth process of part 126 is similar to the fourth process of part 124 in that just the particular sub-trees represented within the composite request are replicated to the new directory server, specifically just the actual sub-trees encompassed by the composite request, where no sub-tree includes a base node of a first-level node corresponding to a suffix. However, the fifth process differs from the fourth process in that the fourth process is performed where all the attributes of the directory schema are encompassed by the composite record, so that just the filter criteria of the filter information is used to define the information that is to be replicated (i.e., the filter criteria specifically defining the sub-trees having base nodes specified by the base information). In the fifth process, the filter criteria of the filter information is still used to define the sub-trees to be replicated, as in the fourth process.

However, in the fifth process, attribute criteria of the attribute information is also used to define what information contained with these sub-trees is replicated to the new directory structure, which is different than the fourth process. That is, the fourth process is performed where the attribute information of the composite record encompasses all the attributes of the directory schema. Therefore, the attribute criteria defined by the attribute information—i.e., the attributes and/ or the attribute values specified by the attribute information—is unimportant in the fourth process during replication, since it is known that all the attributes of the directory schema are to be replicated. By comparison, in the fifth process, the attribute information of the composite record encompasses just some, and not all, of the attributes of the directory schema. As such, the attribute criteria defined by the attribute information is involved in the fifth process during replication, since it specifies just the attributes of the directory schema that are to be replicated.

Thus, from the first process of part 118 to the fifth process of part 126, greater granularity is provided for in the directory server replication process as needed, corresponding to the information contained within the composite request. The first process of part 118 simply replicates the entire directory. The second process of part 120 replicates just particular suffixes of the entire directory—i.e., just particular sub-trees of the directory that have base nodes that are first-level nodes corresponding to these suffixes. The third process of part 122 replicates just particular sub-trees of the directory, where these sub-trees have base nodes that are not first-level nodes corresponding to the suffixes. The fourth process of part 124 also replicates just particular sub-trees of the directory, where these sub-trees have base nodes that are not first-level nodes corresponding to the suffixes, but in accordance with particular filter criteria. The fifth process of part 126 replicates just particular sub-trees of the directory, where these sub-trees have base nodes that are not first-level nodes corresponding to the suffixes, but in accordance with particular filter criteria and attribute criteria. The first process of part 118 is thus least granular, and the fifth process of part 126 is most granular.

Once the process by which the directory server should be replicated has been determined in part 116, the method 100 proceeds to FIG. 1C, where it determines the type of replication as to which the directory server should be replicated, based on the information collected (128). That is, the type of the new directory server replicated from the directory server via the process selected in part 116 is determined in part 128. The new directory server may be one or more of four different types: a replica, a forwarder, a master, and/or a gateway.

That the new directory server is a replica of the directory server in question means that the new directory server contains a copy of the directory information contained within the directory server. A replica is thus a copy of the entire directory, or of portions of the directory, depending on the process that has been selected. A replica may be considered as providing a back-up of these replicated portions of the directory.

That the new directory server is a forwarder of the directory server in question means that the new directory server is a replica server that specifically replicates all the changes sent to it. A forwarding server may also be considered as a cascading server.

That the new directory server is a master server of the directory server in question means that the new directory server contains the master directory information from which updates are propagated to the replica servers. All changes are made to and occur on the master server, and the master server is responsible for propagating these changes to the replica servers. There can be several servers acting as masters for directory information, with each master server responsible for updating other master servers and replica servers. In this situation, the master servers are peer servers to one another, and replicate information in a process known as peer replication.

Peer replication can improve performance and reliability. Performance is improved by providing a local server with the ability to handle updates in a widely distributed network.

Reliability is improved by providing a backup master server that is ready to take over immediately if the primary master server fails.

It is noted that a forwarder, or forwarding server, contrasts with a master server as follows. A master server only replicates changes that are made by clients connected to that server. By comparison, a forwarding server replicates all changes sent to it, regardless from where these changes are received.

Finally, that the new directory server is a gateway server of the directory server in question means that the new directory server is involved in gateway replication. That is, the new directory server, as a gateway server, collects and distributes replication information across the entire network, which such replication information distribution is referred to as gateway replication. Gateway replication can be beneficial to reduce network traffic and congestion.

Therefore, where the number of read requests, search requests, and/or compare requests encompassed by the composite request for any directory suffix or sub-tree encompassed by the composite request is greater than or equal to a first threshold, the method 100 performs part 132 or part 134 (130). That the composite request encompasses a number of read requests, search requests, and or compare requests can mean that the total number of such requests collected as the networking information in part 108. Thus, if there are R read requests, S search requests, and C compare requests, the number that is compared against the first threshold in part 130 is the sum R+S+C. The first threshold may in one embodiment also be based on the hardware of the system and the directory server capabilities, as has been described.

Where the networking information indicates that a second threshold has been reached in relation to any sub-net, a first type of replication is selected in which the new directory server is just a replica of the directory server (132). For example, the network information may be examined to determine the number of the requests R+S+C originating in each given sub-net. If the number of these requests originating in any sub-net is greater than the second threshold, then the first type of replication is selected. The second threshold may in one embodiment also be based on the hardware of the system and the directory server capabilities, as has been described. Otherwise, where the networking information does not indicate that the second threshold has been reached in relation to any sub-net, a second type of replication is selected in which the new directory server is both a forwarder and a replica of the directory server in question (134).

Next, where the number of update requests and/or write requests encompassed by the composite request for any directory suffix or sub-tree encompassed by the composite request is greater than or equal to a third threshold, the method 100 performs part 38 or part 140 (136). That the composite request encompasses a number of update requests and/or write requests can mean that the total number of such requests collected as the networking information in part 108. Thus, if there are U update requests and W write requests, the number that is compared against the third threshold in part 136 is the sum U+W. The third threshold may be equal to or different than the first threshold. In one embodiment, the third threshold may also be based on the hardware of the system and the directory server capabilities, as has been described.

Where the networking information indicates that the second threshold has been reached in relation to any sub-net, a third type of replication is selected in which the new directory server is a master of the directory server (138). For example, the network information may be examined to determine the number of the requests U+W originating in each given sub-net. If the number of these requests originating in any sub-net is greater than the second threshold, then the third type of replication is selected. Otherwise, where the network information does not indicate that the second threshold has been reached in relation to any sub-net, a fourth type of replication is selected in which the new directory server is a gateway of the directory server in question (140).

Thus, once the process by which replication is to be performed in determined in part 116, and the type of the new directory server is determined in part 128, the method 100 proceeds to replicate the new directory server (142). In particular, the new directory server is replicated from the directory server in question using the process determined in part 116. Likewise, the new directory server is replicated so that it is of the type that has been determined in part 128.

FIG. 2 shows a system 200, according to an embodiment of the invention. The system 200 includes a learning engine 202, a determination engine 204, and a replication engine 206. Each of the engines 202, 204, and 206, as well as each of its constituent components, may be implemented in software, hardware, or a combination of software and hardware, as can be appreciated by those of ordinary skill within the art.

The learning engine 202 performs part 102 of the method 100. Specifically, the learning engine 202 collects information regarding requests made to a directory server by clients. The learning engine 202 includes an information gathering component 208 and an information processing component 208. The component 208 performs parts 104, 106, and 108 of the method 100, and thus is the component that collects the information regarding read, compare, search, write, and update requests made to the directory server. The component 210, by comparison, performs part 110 of the method 100, and thus is the component that updates a composite request encompassing all the requests made to the directory server by the clients.

The determination engine 204 performs parts 112, 114, 116, and 128 of the method 100. Specifically, the determination engine 204 determines the process by which the directory server should to be replicated and the type of replication as to which the directory server should be replicated. The determination engine 204 includes a process determining component 212 and a type determining component 214. The process determining component determines the process by which the directory server should be replicated, and thus performs parts 118, 120, 122, 124, and 126 of the method 100. The type determining component 214 determines the type of replication as to which the directory server should be replicated, and thus performs parts 130, 132, 134, 136, 138, and 140 of the method 100.

The replication engine 206 performs part 142 of the method 100, and thus replicates a new directory server from the directory server using the process that has been determined so that the new directory server has the type that has been determined. The replication engine 206 specifically includes a performing component 216 that performs this replication. The replication engine 206 also includes a tracking component 218 and a monitoring component 220. The tracking component 218 tracks the new directory server after it has been replicated to ensure that the new server is performing properly, while the monitoring component 220 monitors the replication process of the new directory server beforehand to ensure that the new server is replicated properly, as can be appreciated by those of ordinary skill within the art.

FIG. 3 shows a system 300, according to another embodiment of the invention. The system 300 includes clients 302 that make requests intended for a directory server 306 but that are initially received by a topology router 304. The topology router 306 may be a proxy server or router, or another type of topology router. The topology router 306 determines to which directory server each of the requests sent by the clients 302. In the simple example of FIG. 3, there is a single directory server 306 prior to replication of the new directory server 308, such that this directory server 306 requests the requests sent by the clients 302, through the topology router 304. It is noted that there may be more than one topology router 304, as can be appreciated by those of ordinary skill within the art, just as there can be more than one directory server 306, as can also be appreciated by those of ordinary skill within the art. That is, the architecture of the system 300 is presented in simplified for aiding understanding thereof.

The directory server 306 can include a software and/or hardware plug-in 310, which is a component that provides the server 306 with additional functionality. In particular, the plug-in 310 implements the learning engine 202 at least in part; where there is more than one directory server 306, the plug-ins of all the directory servers can be said to implement the learning engine 202 in a distributed fashion. As such, the plug-in 310 generates information 312 that encompasses the information collected by the information gathering component 208 in FIG. 2 as well as the composite request generated by the information processing component 210 in FIG. 2.

The determination and replication engines 314 implement the determination engine 204 and the replication engine 206. As such, the engines 314 determine whether a new directory server should be replicated by performing parts 112 and 114 of the method 100. The engines 314 then determine the process by which this new directory server should be replicated by performing part 116 of the method 100, and the type of this new directory server by performing part 128 of the method 100. Thereafter, the engines 314 actually replicate the new directory server 308 by performing part 142 of the method 100.

The new directory server 308 also includes a software and/or hardware plug-in 316 that corresponds to the plug-in 310 of the directory server 306, such that when both the directory servers 306 and 308 are fielding client requests, the plug-ins 310 and 316 together thereafter implement the functionality of the learning engine 202 to generate the information 312. In addition, the topology router 304 includes a software and/or plug-in 318. The plug-in 318 permits the topology router 304 to learn from the engines 314 that the new directory server 308 has been replicated, so that the topology router 304 thereafter sends client requests to both the directory server 306 and the new directory server 308.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A method for replicating a directory server comprising:
   collecting information regarding requests made to the directory server by clients;
   determining a process by which the directory server should be replicated based on the information collected, where the process is determined based on the requests made to the directory server by the clients, as opposed to the requests made just by one of the clients;
   determining a type of replication as to which the directory server should be replicated based on the information collected, where the type of replication is determined based on the requests made to the directory server by the clients, as opposed to the requests made just by one of the clients; and,
   replicating a new directory server from the directory server using the process that has been determined, the new directory server having the type of replication that has been determined, such that replicating the new directory server having the type of replication that has been determined and using the process that has been determined results in the new directory server being accessible by the clients, and not just by one of the clients.

2. The method of claim 1, wherein the requests made to the directory server by the clients include read, compare, search, write, and update requests,
   the method further comprising determining whether a number of the read, compare and search requests is greater than a threshold and/or whether a number of the write and update requests is greater than the threshold,
   such that, in response to determining that the number of the read, compare, and search requests is greater than the threshold and/or that the number of the write and update requests is greater than the threshold,
   the process by which the directory server should be replicated and the type of replication as to which the directory server should be replicated are determined, and the new directory server is replicated from the directory server.

3. The method of claim 1, wherein collecting the information regarding the requests made to the directory server by the clients comprises:
   collecting information regarding read, compare, search, write and update requests made to the directory server by the clients; and,
   collecting networking information regarding the clients making the requests.

4. The method of claim 3, wherein collecting the information regarding read, compare, search, write and update requests made to the directory server by the clients comprises:
   collecting base, scope, filter, and attribute information for read, compare, and search requests made to the directory server by the clients; and,
   collecting base distinguished name (base DN) information for write and update requests made to the directory server by the clients.

5. The method of claim 1, wherein collecting the information regarding the requests made to the directory server by the clients comprises, for each specific request made to the directory server:
   where the specific request is not contained in a composite request encompassing all previously made requests to the directory server by the clients, performing a logical OR operation on the composite request with the specific request to update the composite request; and,
   where the specific request is already contained in the composite request, ignoring the specific request.

6. The method of claim 1, wherein determining the process by which the directory server should be replicated comprises:
   where a composite request encompassing all previously made requests to the directory server by the clients includes base information encompassing all directory suffixes of the directory server, the composite request includes scope information encompassing sub-levels of all the directory suffixes, the composite request includes filter information encompassing object classes of all the directory suffixes, and the composite request includes attribute information encompassing all attributes of a directory schema of the directory server,
selecting the process by which the directory server should be replicated as a first process in which an entire directory of the directory server is replicated.

7. The method of claim 6, wherein determining the process by which the directory server should be replicated further comprises:
where the composite request includes base information encompassing some but not all of the directory suffixes of the directory server, the composite request includes scope information encompassing the sub-levels of some but not all the directory suffixes, the composite request includes filter information encompassing the object classes of some but not all the directory suffixes, and the composite request includes attribute information encompassing all the attributes of the directory schema,
selecting the process by which the directory server should be replicated as a second process in which just particular suffixes of the entire directory of the directory server are replicated; and,
where the composite request includes base information encompassing some but not all directory sub-trees of the directory server, the composite request includes scope information encompassing sub-levels of some but not all the directory sub-trees, the composite request includes filter information encompassing object classes of some but not all the directory sub-trees, and the composite request includes attribute information encompassing all the attributes of the directory schema,
selecting the process by which the directory server should be replicated as a third process in which just particular directory sub-trees of the entire directory of the directory server are replicated.

8. The method of claim 7, wherein determining the process by which the directory server should be replicated further comprises:
where the composite request includes base information encompassing some but not all the directory sub-trees, the composite request includes scope information encompassing the sub-levels, base levels, and/or one-levels of some but not all the directory sub-trees, the composite request includes filter information for some but not all the directory sub-trees, and the composite information includes attribute information encompassing all the attributes of the directory schema,
selecting the process by which the directory server should be replicated as a fourth process in which just particular directory sub-trees of the entire directory of the directory server are replicated with filter criteria corresponding to the filter information of the composite request; and,
where the composite request includes base information encompassing some but not all the directory sub-trees, the composite request includes scope information encompassing the sub-levels, base levels, and/or one-levels of some but not all the directory sub-trees, the composite request includes filter information for some but not all the directory sub-trees, and the composite information includes attribute information for some but not all the attributes of the directory schema,
selecting the process by which the directory server should be replicated as a fifth process in which just particular directory sub-trees of the entire directory of the directory server are replicated with filter criteria corresponding to the filter information of the composite request and with attribute criteria corresponding to the attribute information of the composite request.

9. The method of claim 1, wherein determining the type of replication as to which the directory server should be replicated comprises, where a composite request encompasses all previously made requests to the directory server by the clients, and where the previously made requests include at least read requests, search requests, and compare requests:
where a number of the read requests, search requests, and/or compare requests encompassed by the composite request for any directory suffix or directory sub-tree of the directory server is greater than or equal to a first threshold,
where networking information regarding the clients making the requests indicate that a second threshold has been reached in relation to any sub-net,
selecting the type of replication as a first type of replication in which the new directory server is a replica of the directory server; and,
where the networking information indicates that the second threshold has not been reached in relation to any sub-net,
selecting the type of replication as a second type of replication in which the new directory server is a forwarder and a replica of the directory server.

10. The method of claim 9, wherein determining the type of replication as to which the directory server should be replicated further comprises, where the composite request encompasses all the previously made requests to the directory server by the clients, and where the previously made requests also include at least update requests and write requests:
where a number of the update requests and/or write requests encompassed by the composite request for any directory suffix or directory sub-tree of the directory server is greater than or equal to a third threshold,
where the networking information regarding the clients making the request indicates that the second threshold has been reached in relation to any sub-net,
selecting the type of replication as a third type of replication in which the new directory server is a master of the directory server; and,
where the networking information indicates that the second threshold has not been reached in relation to any sub-net,
selecting the type of replication as a fourth type of replication in which the new directory server is a gateway for the directory server.

11. A system comprising:
a learning engine to collect information regarding requests made to a directory server by clients;
a determination engine to determine a process by which the directory server should be replicated based on the information collected and to determine a type of replication as to which the directory server should be replicated based on the information collected, where both the process and the type of replication are determined based on the requests made to the directory server by the clients, as opposed to the requests made just by one of the clients; and,
a replication engine to replicate a new directory server from the directory server using the process that has been determined, the new directory server having the type of replication that has been determined, such that replicating the new directory server having the type of replication that has been determined and using the process that has been determined results in the new directory server being accessible by the clients, and not just by one of the clients.

12. The system of claim 11, wherein the directory server comprises a plug-in to implement the learning engine.

13. The system of claim 11, further comprising a topology router comprising a plug-in to receive information regarding the new directory server replicated.

14. The system of claim 11, wherein the learning engine comprises:
   an information gathering component to collect the information regarding the requests made to the directory server by the clients, the requests including read, compare, search, write, and update requests made to the directory server by the clients; and,
   an information processing component to update a composite request encompassing all the requests made to the directory server by the clients.

15. The system of claim 11, wherein the determination engine comprises:
   a first component to determine the process by which the directory server should be replicated based on the information collected, the process selected from a plurality of processes comprising:
      a first process in which an entire directory of the directory server is replicated;
      a second process in which just particular suffixes of the entire directory of the directory server are replicated;
      a third process in which just particular directory sub-trees of the entire directory of the directory server are replicated;
      a fourth process in which just particular directory sub-trees of the entire directory of the directory server are replicated with filter criteria corresponding to filter information of the composite request;
      a fifth process in which just particular directory sub-trees of the entire directory of the directory server are replicated with filter criteria corresponding to the filter information of the composite request and with attribute criteria corresponding to attribute information of the composite request; and,
   a second component to determine the type of replication as to which the directory server should be replicated based on the information collected, the type selected from a plurality of types comprising:
      a first type of replication in which the new directory server is a replica of the directory server;
      a second type of replication in which the new directory server is a forwarder and a replica of the directory server;
      a third type of replication in which the new directory server is a master of the directory server;
      a fourth type of replication in which the new directory server is a gateway for the directory server.

16. The system of claim 11, wherein the determination engine is to determine the process by which the directory server should be replicated and is to determine the type of replication as to which the directory server should be replicated upon determining that a number of read, compare, and search requests of the requests made to the directory server is greater than a threshold and/or that a number of write and update requests of the requests made to the directory server is greater than the threshold.

17. A non-transitory computer-readable medium having one or more computer programs stored thereon to perform a method comprising:
   collecting information regarding requests made to a directory server by clients, the requests including read, compare, search, write, and update requests;
   determining whether a number of the read, compare and search requests is greater than a threshold and/or whether a number of the write and update requests is greater than the threshold;
   in response to determining that the number of the read, compare, and search requests is greater than the threshold and/or that the number of the write and update requests is greater than the threshold,
      determining a process by which the directory server should be replicated based on the information collected, where the process is determined based on the requests made to the directory server by all the clients, as opposed to the requests made just by one of the clients;
      determining a type of replication as to which the directory server should be replicated based on the information collected, where the type of replication is determined based on the requests made to the directory server by the clients, as opposed to the requests made just by one of the clients; and,
      replicating a new directory server from the directory server using the process that has been determined, the new directory server having the type of replication that has been determined, such that replicating the new directory server having the type of replication that has been determined and using the process that has been determined results in the new directory server being accessible by the clients, and not just by one of the clients.

18. The non-transitory computer-readable medium of claim 17, wherein determining the process by which the directory server should be replicated comprises selecting the process from a plurality of processes comprising:
   a first process in which an entire directory of the directory server is replicated;
   a second process in which just particular suffixes of the entire directory of the directory server are replicated;
   a third process in which just particular directory sub-trees of the entire directory of the directory server are replicated;
   a fourth process in which just particular directory sub-trees of the entire directory of the directory server are replicated with filter criteria corresponding to filter information of the composite request;
   a fifth process in which just particular directory sub-trees of the entire directory of the directory server are replicated with filter criteria corresponding to the filter information of the composite request and with attribute criteria corresponding to attribute information of the composite request; and,
   wherein determining the type of replication as to which the directory server should be replicated comprises selecting the type from a plurality of types comprising:
   a first type of replication in which the new directory server is a replica of the directory server;
   a second type of replication in which the new directory server is a forwarder and a replica of the directory server;
   a third type of replication in which the new directory server is a master of the directory server;
   a fourth type of replication in which the new directory server is a gateway for the directory server.

19. The method of claim 1, wherein the information collected is stored in a composite request comprising:

scope information encompassing sub-levels, base-levels, and/or one-levels of at least some of directory sub-trees of the directory server; and attribute information encompassing attributes of a directory schema of the directory server.

20. The method of claim 1, wherein the type of replication as to which the directory server should be replicated is determined based on the information collected from a plurality of types comprising:

a first type of replication in which the new directory server is a replica of the directory server;

a second type of replication in which the new directory server is a forwarder and a replica of the directory server;

a third type of replication in which the new directory server is a master of the directory server;

a fourth type of replication in which the new directory server is a gateway for the directory server.

* * * * *